(12) United States Patent
Bayer et al.

(10) Patent No.: US 10,087,311 B2
(45) Date of Patent: Oct. 2, 2018

(54) PROCESS FOR PRODUCING A HYDROPHOBIC COMPOSITE BIOELASTOMER COMPRISING STARCH

(71) Applicant: FONDAZIONE ISTITUTO ITALIANO DI TECNOLOGIA, Genoa (IT)

(72) Inventors: Ilker S. Bayer, Genoa (IT); Elisa Mele, Castrignano dei Greci (IT); Despina Fragouli, Genoa (IT); Roberto Cingolani, Ceranesi (IT); Athanasia Athanasiou, Ceranesi (IT)

(73) Assignee: FONDAZIONE ISTITUTO ITALIANO DI TECHNOLOGIA, Genoa (IT)

( * ) Notice: Subject to any disclaimer, the term of this patent is extended or adjusted under 35 U.S.C. 154(b) by 0 days.

(21) Appl. No.: 14/903,786

(22) PCT Filed: Jul. 7, 2014

(86) PCT No.: PCT/IB2014/062919
§ 371 (c)(1),
(2) Date: Jan. 8, 2016

(87) PCT Pub. No.: WO2015/004593
PCT Pub. Date: Jan. 15, 2015

(65) Prior Publication Data
US 2016/0160011 A1 Jun. 9, 2016

(30) Foreign Application Priority Data

Jul. 8, 2013 (IT) .................. TO2013A0570

(51) Int. Cl.
| | |
|---|---|
| C08L 3/06 | (2006.01) |
| C08L 3/02 | (2006.01) |
| C08L 83/04 | (2006.01) |
| C08J 3/24 | (2006.01) |
| C08K 3/36 | (2006.01) |
| C08K 5/5419 | (2006.01) |
| C08K 5/57 | (2006.01) |
| C08L 83/00 | (2006.01) |
| C08L 83/02 | (2006.01) |
| C08L 83/06 | (2006.01) |
| C08G 77/16 | (2006.01) |

(52) U.S. Cl.
CPC . *C08L 3/06* (2013.01); *C08J 3/24* (2013.01); *C08J 3/246* (2013.01); *C08K 3/36* (2013.01); *C08K 5/5419* (2013.01); *C08K 5/57* (2013.01); *C08L 3/02* (2013.01); *C08L 83/00* (2013.01); *C08L 83/02* (2013.01); *C08L 83/04* (2013.01); *C08L 83/06* (2013.01); *C08G 77/16* (2013.01); *C08J 2383/04* (2013.01); *C08J 2383/06* (2013.01); *C08J 2403/02* (2013.01)

(58) Field of Classification Search
CPC .... C08L 3/06; C08L 3/02; C08L 83/04; C08J 3/24; C08J 3/246; C08J 2383/04; C08J 2383/06; C08J 2403/02
See application file for complete search history.

(56) References Cited

U.S. PATENT DOCUMENTS

| | | | |
|---|---|---|---|
| 5,205,863 A * | 4/1993 | Elion | C08B 31/04 106/126.3 |
| 5,362,777 A | 11/1994 | Tomka | |
| 5,374,671 A | 12/1994 | Corvasce et al. | |
| 5,545,680 A | 8/1996 | Corvasce et al. | |
| 5,714,601 A | 2/1998 | Tanaka et al. | |
| 6,180,249 B1 * | 1/2001 | Stein | C09D 5/1637 106/287.14 |
| 7,264,650 B2 * | 9/2007 | Lou | B01D 46/10 95/45 |
| 2010/0184883 A1 | 7/2010 | Detemmerman et al. | |
| 2011/0196071 A1 * | 8/2011 | Mentink | A23G 4/08 524/51 |

FOREIGN PATENT DOCUMENTS

EP 1621579 A1 2/2006

OTHER PUBLICATIONS

Sair, L., and W. R. Fetzer. "Determination of moisture in starch and its modifications." Industrial & Engineering Chemistry Analytical Edition 14.11 (1942): 843-845.*
Hao, Limei, Zhanhua Shi, and Xiaopeng Zhao. "Mechanical behavior of starch/silicone oil/silicone rubber hybrid electric elastomer." Reactive and Functional Polymers 69.3 (2009): 165-169.*
Hao, Limei, Changlin Ding, and Xiaopeng Zhao. "A novel electric elastomer based on starch/transformer oil drop/silicone rubber hybrid." Journal of Applied Polymer Science 119.5 (2011): 2991-2995.*
Swinkels, J. J. M. "Composition and properties of commercial native starches." Starch—Stärke 37.1 (1985): 1-5.*
International Search Report and Written Opinion of the International Searching Authority in application No. PCT/IB2014/062919, dated Apr. 10, 2015, 7 pages.

* cited by examiner

*Primary Examiner* — Nicholas E Hill
(74) *Attorney, Agent, or Firm* — Meunier Carlin & Curfman LLC

(57) ABSTRACT

Process for producing a hydrophobic composite bioelastomer, comprising a cross-linked bioelastomer matrix in which an organic phase is dispersed, comprising the reaction of cross-linking of a hydroxyl-terminated polysiloxane with a silane coupling agent, comprising an acetoxysilane, to obtain a cross-linked polysiloxane with release of acetic acid. The reaction of cross-linking is carried out in the presence of starch to cause at least partial in situ acetylation by the acetic acid released from said starch that is incorporated in the cross-linked bioelastomer matrix.

18 Claims, No Drawings

PROCESS FOR PRODUCING A HYDROPHOBIC COMPOSITE BIOELASTOMER COMPRISING STARCH

The present invention relates to a process for producing hydrophobic composite bioelastomers comprising a cross-linked bioelastomer matrix, in which an organic phase is dispersed.

In particular, the invention relates to composite bioelastomers comprising a polysiloxane as cross-linked matrix polymer and starch as dispersed phase.

Starch is a completely biodegradable polysaccharide that is synthesized by various plants, such as maize, potato, rice, and wheat, and constitutes one of the most abundant renewable resources available.

In its granular form, starch is mainly composed of linear amylose and highly branched amylopectin, the relative percentages of which vary depending on the plant from which the starch is obtained. Starch may be regarded as a crystalline material having an intrinsic water content, which generally varies between 10 and 19 wt %.

Owing to the crystalline nature of starch, plastics obtained from native starch are extremely fragile and do not meet the requirements in terms of mechanical properties required by the plastics industry. To overcome this drawback, starch is mixed with a limited amount of water (10-30%) and is submitted to thermal and mechanical treatment (shear stress) in an "extrusion cooking" process, so as to cause destructuring of the molecule, obtaining a fairly homogeneous melt, known as thermoplastic starch (TPS) or destructured starch.

However, the TPS thus obtained has many disadvantages, including mechanical properties that are still inadequate, due to the known phenomenon of retrogradation, particularly in wet or dry environments. The problem with using TPS in bioplastic composites is its fragile nature, caused by its relatively low glass transition temperature and non-suitability for modifying the glass transition temperature owing to the molecular chain of starch.

In the production of thermoplastic starch it is conventional practice to perform destructuring of starch in the presence of plasticizers, such as polyols, formamide, urea, acetamide, sugars, amino acids, lipids and phosphate sorbates, for the purpose of increasing the flexibility of TPS.

U.S. Pat. No. 5,362,777 defines TPS as the product resulting from mixing native starch, dehydrated beforehand, with a plasticizer such as glycerol. However, migration of the plasticizers into the surroundings causes increased fragility over time.

It is stated in the prior art that formulations of plasticized TPS generally contain from 50 to 90 wt % of starch and from 10% to 50% of plasticizer.

Another problem relating to the use of TPS is due to the high amylose content of starch, which causes decreased flexibility compared to TPS obtained from a material with high amylopectin content.

Polymer compositions are also known that comprise TPS and a polymer, which may or may not be compatible with starch. With reference to hydrophobic polymers that are not compatible with starch, U.S. Pat. No. 5,374,671 and U.S. Pat. No. 5,545,680 describe compositions that comprise destructured starch as filler dispersed in elastomers, such as for example polyisoprene rubber, styrene-butadiene rubber and polybutadiene rubber.

EP 1 621 579 describes polymer compositions of hydrophobic nature, comprising polymers compatible with starch, for example polyolefins, polyamides and natural or synthetic rubbers that contain starch complexes as dispersed filler, in which starch is complexed with polymers that are compatible with starch. The production process may include addition of silane coupling agents.

Acetylation constitutes an important industrial modification of starch. The general acetylation process involves activation by repeated impregnation of starch in glacial acetic acid and filtration by further impregnation in a 2% solution of perchloric acid in glacial acetic acid, followed by filtration. The activated starch is then treated with a mixture of acetic anhydride and benzene; at the end of this treatment, the starch thus modified is washed several times with benzene, filtered and finally dried at room temperature. The acetylated starch may be transformed into fibres and nanofibres by a process in solution and has also been used as an additive in adhesives.

One aim of the present invention is to provide an advantageous process for producing composite bioelastomers with a hydrophobic matrix, containing starch.

Another aim of the invention is to provide a process that can be carried out at room temperature, and that makes it possible to obtain a starch-filled bioelastomer, in which the starch has improved interfacial compatibility with the elastomer, and also makes it possible to obtain hydrophobic bioelastomers with controlled mechanical properties and improved water resistance.

In view of these aims, one object of the invention is a process having the characteristics defined in the claims that follow, which constitute an integral part of the present description.

Another object of the invention is a hydrophobic composite bioelastomer, such as is obtainable by the aforementioned process.

The process of the invention employs the reaction of cross-linking of silanols (as precursors of silicone polymers) with acetoxysilanes to form silicone elastomers containing starch as dispersed phase, in which the starch has improved interfacial compatibility with the silicone elastomer.

The acetoxysilanes are used as cross-linking agents of silanols (precursors of silicone polymers) to form silicone elastomers. This process is commonly known as room temperature vulcanizing technology. The silicones thus obtained are commonly called RTV silicones. The cross-linking process employs environmental moisture as catalyst.

During the reaction of cross-linking of silanols in the presence of acetoxysilanes, an appreciable amount of acetic acid is released as by-product (up to 10% relative to the silicone polymer precursor). In RTV silicone adhesives or sealants, release of acetic acid is generally regarded as a disadvantage owing to its odour and its corrosive effects.

In the context of the process according to the invention, this disadvantage is on the contrary used advantageously to activate the in situ acetylation of starch, leading to excellent interfacial compatibility with the elastomeric polymer.

The starch used in the process is preferably a native starch, for example maize, wheat, rice or potato starch; maize starch or potato starch being preferred. These native starches may, however, also be used mixed with chemically or physically modified starches, for example dextrinized starch, starch treated with acid, starch treated with alkaline agents, bleached starch, oxidized starch, starch treated with enzymes, monostarch phosphate, starch phosphate, distarch phosphate, phosphated distarch phosphate, acetylated distarch phosphate, starch acetate, acetylated distarch adipate, hydroxypropylstarch, hydroxypropyl distarch phosphate, sodium starch octenylsuccinate, acetylated oxidized starch.

Starch esters, as described in U.S. Pat. No. 5,714,601 (incorporated by reference), may also be used in combination with or replacing the aforementioned unmodified native starches.

The native starches may be used as such, i.e. with their intrinsic water content, without prior dehydration. However, the process also envisages the use of destructured or thermoplastic starch, obtained by processes known in the prior art for this purpose, optionally in the presence of plasticizers.

Plasticized starch may be used provided it is in the form of fine powders.

Typical acetoxysilanes comprise di-tert.-butoxy-diacetoxysilane, methyltriacetoxysilane, ethyltriacetoxysilane, vinyltriacetoxysilane, propyltriacetoxysilane and mixtures thereof, it being understood that it is possible to use a single acetoxysilane or a suitable mixture of various acetoxysilanes.

Moreover, the list given above is not to be understood as being exhaustive or limiting, as the process envisages the use of any acetoxysilane that is able to cause cross-linking of the polysiloxane used in a particular instance.

Moreover, it is possible to use, in combination with the acetoxysilanes, other silane coupling agents, typically in an amount under 1% relative to the total silicone polymer; these silanes include, as non-limiting examples, chlorosilanes, epoxysilanes, vinylsilanes, oximinosilanes, alkoxysilanes and mixtures thereof.

In the context of the invention, it is possible to use any precursor of silicone polymer capable of cross-linking with acetoxysilanes to form a silicone elastomer. This definition includes hydroxyl-terminated polysiloxanes with (SiO $R_1$ $R_2$) repeating units, in which $R_1$ and $R_2$ are selected from hydrogen and $C_1$-$C_4$ alkyl optionally substituted with halogen, especially fluorine; the use of polydimethylsiloxane (PDMS) is particularly preferred.

The use of silicone sealants that vulcanize at room temperature (RTV silicone sealants) is included within the scope of the invention. These sealants are marketed as single-component mixtures, comprising an excess of functional acetoxysilanes added to PDMS with silanol end groups, resulting in a PDMS chain with acetoxy groups at the ends. When this compound is exposed to moisture, some acetoxy groups are hydrolysed and self-condense or react with other acetoxy groups, giving rise to rapid cross-linking with formation of acetic acid.

The polymer component of the composite bioelastomers according to the invention may, however, comprise other silicones, for example soft silicones cross-linkable by metal or organometal catalysis; the polydialkylsiloxanes mentioned above may be added to these silicones to modulate the mechanical properties of the composite elastomer obtained.

The polymer component may, moreover, comprise other biodegradable polymers, for example cellulose derivatives, aliphatic polyesters, in particular polycaprolactone and aliphatic-aromatic polyesters.

In the composite bioelastomer according to the invention, the weight ratio of silicone elastomer to any additional biodegradable polymer, preferably selected from those stated above, may for example be between 10 and 30 wt % relative to the amount of total silicone polymer.

In a first embodiment of the production process, starch, as defined above, preferably native starch, is mixed with the silane coupling agent comprising acetoxysilanes, preferably in an amount for which the amount of starch in the mixture is between 80 and 95 wt %.

Mixing may be carried out mechanically, continuously, in any mixing equipment suitable for this purpose, preferably in room temperature conditions, until a mixture having a paste-like consistency is obtained.

If necessary, the viscosity of the mixture may be reduced by adding small amounts, preferably less than 5 wt % relative to the final weight of paste, of diluents, for example toluene, mineral spirits, hexane, heptane or other ecologically preferable diluents, for example limonene, ethyl acetate or terpenes.

Moreover, in this step it is possible to add synthetic nanoparticles, functionalized or untreated, to the mixture, for example titanium dioxide, iron oxide, silica, zinc oxide, carbon black, in order to produce particular properties, such as resistance to UV radiation, antimicrobial properties and heat resistance. Addition of vegetable powders may also be considered.

The final concentration of the synthetic nanoparticles added preferably does not exceed 10 wt %, and more preferably is between 1 and 5 wt % relative to the weight of the resultant suspension (optionally diluted). The final, mixture is preferably also submitted to mechanical stirring, until the desired consistency is obtained, optionally with moderate heating, preferably not above 60° C.

In this embodiment, the final step comprises addition of the hydroxyl-terminated polysiloxane resin, as defined above, and any other silicone precursors or biodegradable polymers. A specific example is the use of hydroxyl-terminated polydimethylsiloxane, preferably with molecular weight of about 100000 and viscosity of 50000 cSt. Naturally it is possible to use a mixture of hydroxyl-terminated polydimethylsiloxane resins with various molecular weights.

The relative weight ratio of hydroxyl-terminated polysiloxane resin to acetoxysilanes is preferably maintained between 8 and 25 in the paste obtained following addition of the polymer component. Following addition of the hydroxyl-terminated siloxane resins in ambient conditions, cross-linking starts as a result of the catalytic action of the environmental moisture. Using non-dehydrated starch, the intrinsic water content of the starch is able to cause the cross-linking reaction to begin in the absence of atmospheric moisture.

If necessary, in this step it is also possible to add diluents to reduce the viscosity, using the diluents mentioned above.

After the start of the reaction, the mixture may be poured into a non-adherent mould of any desired shape and size. Preferably, mechanical stirring of the mixture is maintained in the mould for a sufficient time (for example 15 minutes) to cause activation on the surface of the starch particles with the acetic acid that forms as a by-product of the reaction of the hydroxyl-terminated polysiloxane with the acetoxysilane.

Mechanical stirring may be continued in the mould until a homogeneous mixture is obtained, and there is development of a distinct odour of acetic acid.

The mould containing the mixture may be maintained at ambient conditions, for example for times from 24 to 72 hours, until there is complete consumption of the acetic acid. The final product can be removed from the non-adherent mould easily, following cessation of the reaction with acetic acid.

In general, in the bioelastomer obtainable by the process according to the invention, starch may be present in an amount preferably between 14 and 70 wt %, relative to the total weight of the bioelastomer, depending on the desired properties and the field of application.

In a second embodiment, an RTV silicone sealant (transparent or pigmented) containing silane coupling agents comprising acetoxysilanes may be mixed directly with starch (as defined above) so that the starch content in the final mixture is preferably within the aforementioned range from 14% to 70%.

Since the commercial RTV silicones are single-component sealants, immediately after mixing with starch, acetic acid begins to be released in the presence of atmospheric moisture or in the presence of the intrinsic water content of the starch. In this case too, for activation of acetylation of the starch particles with the acetic acid produced, it is preferable to maintain continuous mechanical stirring (for example for times of from 15 to 30 minutes).

The diluents mentioned above may be added to reduce the high viscosity of the RTV silicones, during stirring. The nanoparticles described above, or fine vegetable powders, for example of basil, cinnamon and the like, may be added to the mixture, with the aim of producing a natural colour and/or antioxidant and antimicrobial properties.

Preferably, the final viscosity should be maintained between 1 and 25 cSt. After stirring, the mixture may be poured into a non-adhesive mould for the desired application. This is followed by the process steps described above in relation to the first embodiment.

In all the embodiments of the process, it is possible to envisage the addition of colorants and especially of colorants of natural origin to obtain coloured bioelastomers. Among the colorants, the vegetable powders already mentioned are preferred, and of these, in particular, beetroot powders, preferably dehydrated, suitable for imparting a colour from pink to red to the bioelastomers. It was found that addition of beetroot powder exerts an unexpected and surprising additional effect on cross-linking and hardening of the bioelastomers. Addition of beetroot powder in fact accelerates the mechanism of hardening of the bioelastomers considerably. In the absence of this additive the elastomers generally harden in times varying from a few hours, up to 24 hours, according to the chemistry of cross-linking of the silicones catalysed by the environmental moisture. With addition of beetroot powder during preparation, hardening begins within times of the order of 5 to 15 minutes and proceeds much more quickly than when this additive is absent.

In a typical production process that utilizes this unexpected effect, dehydrated and pulverized beetroot powder is dispersed in the diluent, such as hexane or heptane, that will then be used as diluent in the production of the elastomers. The starch and the silicone precursors are mixed in the desired ratio according to the embodiments described above, and during mixing, rather than adding a pure diluent, the diluent containing or including beetroot powder as dispersed phase is added. At the end of mechanical mixing, the mixture thus obtained is poured into the mould, as described above.

Cross-linking and hardening begin immediately after addition of the beetroot powder; within about 15 minutes the bioelastomers attain almost complete cross-linking. Ideally, the content of beetroot powder in the final bioelastomer may be between 2 and 20 wt %, depending on the desired degree of coloration, which varies from pale pink to red of medium intensity. Presumably the catalytic effect of beetroot is due to some specific phytochemical agents present in its structure, for example betaines, betanins (natural food dyes) and manganese, or to their joint action on cross-linking of the starch-acetoxysilane elastomers according to the invention.

It was found that activation of starch in situ, which usefully exploits the unwanted by-product of the cross-linking reaction, makes it possible to obtain excellent interfacial compatibility with the silicone elastomer. In situ activation further allows instantaneous and stable dispersion of the starch particles together with interfacial adhesion between the precursors and the starch during the cross-linking process. Moreover, the process can be carried out in ambient conditions with considerable advantages in terms of industrial production.

Moreover, the process according to the invention makes it possible to control the mechanical properties of the composite bioelastomer, which can be varied between high values of elongation and high rigidity. The bioelastomer has excellent water resistance and hydrophobicity and maintains mechanical properties in a wide temperature range between at least 50° C. and 100° C.

Furthermore, it is not necessary to use other compatibilizers or plasticizers. The bioelastomer is suitable for numerous applications, including the production of packaging for the food industry with barrier properties to moisture and gases and for the production of articles for household use.

EXAMPLE 1

An initial mixture having the following composition is used:

| Ingredient | CAS number | Amount wt % |
| --- | --- | --- |
| silicone fluid | 63148-62-9 | 55-65 |
| dimethicone | 9016-00-6 | 10-15 |
| methyltriacetoxysilane | 4253-34-3 | 2-4 |
| ethyltriacetoxysilane | 17689-77-9 | 3-6 |
| acetic acid | 64-19-7 | 1-3 |
| silica nanofiller | 7631-86-9 | 5-15 |

The aforementioned mixture (Mix 1) gives rise to a thixotropic mixture. The viscosity may be reduced to 3000-8000 cPs by adding the diluents mentioned above. Optionally, the process of the invention, not limited to the examples given here, may envisage the addition of small amounts of tin-based organometallic catalysts, to accelerate cross-linking, for example dibutyltin dilaurate or dibutyltin diacetate. The concentration of the catalyst may be between 10 and 100 ppm relative to the weight of the polymer ingredient. Starch may be added to the dilute final mixture so as to obtain a starch content from 14 to 75 wt % in the final mixture.

During mixing, continuous stirring is necessary to obtain a homogeneous mixture. After adding the starch, the viscosity of the mixture may be further reduced with the diluents, so as to obtain a suitable viscosity for processes of casting or injection moulding.

EXAMPLE 2

As an alternative to example 1, commercial acetoxysilicones are used, for example products such as Dow Corning 781, AS1521 or AS1522 from ACC Silicones Europe, Elastosil E43 from Wacker Silicones, transparent acetic silicone from Saratoga. These commercial RTV acetoxysilicones are thixotropic pastes and require dilution before being mixed with starch.

EXAMPLE 3

The following initial mixture is used (Mix 1B):

| Ingredient | CAS number | Amount wt % |
|---|---|---|
| hydroxyl-terminated dimethylsiloxane | 70131-67-8 | 60 |
| polydimethylsiloxane | 63148-62-9 | 4 |
| methyltriacetoxysilane | 4253-34-3 | 4 |
| ethyltriacetoxysilane | 17689-77-9 | 4 |
| Ecoflex Supersoft 00-50 part A and/or | — | 14 |
| Ecoflex Supersoft 00-50 part B | — | 14 |

In this example, a mixture of acetoxy cross-linking silicone and condensation (platinum) cross-linking silicone is used. The platinum cross-linking silicones are softer than the acetoxy cross-linking silicones. Their elongation at break can be from two to three times greater than that of the acetoxy cross-linking silicones. This combination makes it possible to obtain formation of softer silicone matrices.

The aforementioned formulation gives rise to a thixotropic mixture. Its viscosity can be reduced to 3000-8000 cPs by dilution with toluene, limonene, xylene or mineral spirits. Starch may be added to the dilute mixture, so as to obtain a final amount of starch of the order of 14 to 75 wt %. During mixing, continuous stirring is required until a homogeneous mixture is obtained.

After starch has been added, the viscosity may be reduced further by adding the aforementioned diluents, so as to obtain a viscosity suitable for injection moulding or casting.

EXAMPLE 4

As an alternative to example 3, commercially available soft silicones may be used, preferably two-component silicones with platinum cross-linking; these may be mixed with single-component acetoxy cross-linking silicone resins. In general, the soft silicones may constitute from 10 to 30 wt % of the final elastomer, relative to the overall content of silicones. Most of the soft silicone resins are available with the brand name Ecoflex from Smooth-On, Inc.

The initial mixture, optionally diluted, may be mixed with starch in the aforementioned ranges from 14 to 75 wt %.

EXAMPLE 5

The following initial formulation is used (Mix 1D):

| Ingredient | CAS number | Amount wt % |
|---|---|---|
| dimethylsiloxane | 70131-67-8 | 65 |
| siloxanes and silicones | 68554-67-6 | 8 |
| dimethyl polymers including methylsilsesquioxanes and dimethylpolysiloxanes | 70131-67-8 | 11 |
| methyltriacetoxysilane | 4253-34-3 | 3 |
| octamethylcyclotetrasiloxane | 556-67-2 | 3 |
| silica nanofiller | 7631-86-9 | 10 |

This silicone matrix may optionally include small amounts of tin catalysts for accelerating cross-linking, for example dibutyltin dilaurate or dibutyltin diacetate; the catalyst concentration is preferably between 10 and 100 ppm in the final resin. The aforementioned mixture may be further mixed with polymer additions in toluene of ethylcellulose or polycaprolactone.

In the case of addition of secondary biodegradable polymers, preferably and not limited to the example in question, their amount may be between 10 and 30 wt % relative to the amount of total silicone polymer.

EXAMPLE 6

Alternatively, an acetoxy cross-linking commercial silicone, of the type mentioned in example 2, may be mixed with solutions in solvent (toluene) of the secondary biodegradable polymers mentioned in the description and in example 5.

EXAMPLE 7

The following initial formulation is used (Mix 1E):

| Ingredient | CAS number | Amount wt % |
|---|---|---|
| hydroxyl-terminated polymethyltrifluoropropylsiloxane | 63148-56-1 | 55-65 |
| dimethicone | 9016-00-6 | 10-15 |
| methyltriacetoxysilane | 4253-34-3 | 2-4 |
| ethyltriacetoxysilane | 17689-77-9 | 3-6 |
| acetic acid | 64-19-7 | 1-3 |
| silica nanofiller | 7631-86-9 | 5-15 |

The formulation containing the acetoxy cross-linking fluorinated silicone gives rise to a thixotropic mixture which, prior to optional dilution, may be mixed with starch in the general ratios stated above.

Also in this case, addition of a tin catalyst may be envisaged.

The invention claimed is:

1. A process for producing a hydrophobic composite bioelastomer comprising a cross-linked bioelastomer matrix in which an organic phase is dispersed, comprising:
   moisture-catalysed cross-linking of a hydroxyl-terminated polysiloxane with a silane coupling agent comprising an acetoxy silane, wherein the weight ratio of said hydroxyl-terminated polysiloxane to said acetoxy silane is between 8 and 25,
   thereby producing a cross-linked polysiloxane with acetic acid release,
   characterized in that the moisture-catalysed cross-linking reaction is carried out in the presence of a native starch comprising water,
   thereby causing at least partial in situ acetylation, by the released acetic acid, of said starch which is embedded in the cross-linked bioelastomer matrix.

2. The process according to claim 1, comprising mixing starch with a mixture comprising:
   said hydroxyl-terminated polysiloxane and said silane coupling agent comprising said acetoxy silane,
   wherein said hydroxyl-terminated polysiloxane comprise a silanol-terminated polydialkylsiloxane, wherein the alkyl has from 1 to 4 carbon atoms and is optionally substituted with halogen.

3. The process according to claim 2, wherein said mixture comprising a hydroxyl-terminated polysiloxane and said silane coupling agent comprises a room temperature vulcanizing silicone sealant.

4. The process according to claim 1 comprising the steps of:
   a) mixing starch with the silane coupling agent comprising acetoxy silane, and
   b) adding, with stirring, to the product resulting from step a), the hydroxyl-terminated polysiloxane, in the presence of moisture, thereby causing cross-linking of the polydialkylsiloxane with acetic acid release and stirring continuously, thereby causing at least partial in situ acetylation of said starch.

5. The process according to claim 4, wherein in step a) starch is mixed with said acetoxy silane in an amount such that the product resulting from step a) contains 80 to 95 wt % of starch.

6. The process according to claim 1, wherein said silane coupling agent further comprises a silane selected from the group consisting of chlorosilanes, epoxysilanes, vinylsilanes, oxyiminosilanes, alkoxysilanes and mixtures thereof.

7. The process according to claim 1, wherein said acetoxy silane is selected from the group consisting of di-tertbutoxy-di acetoxysilane, methyltriacetoxysilane, ethyltriacetoxysilane, vinyltriacetoxysilane, propyltriacetoxysilane and mixtures thereof.

8. The process according to claim 1, wherein a viscosity reducing agent or thinner is added to the mixture of reactants, before cross-linking of said hydroxyl-terminated polysiloxane.

9. The process of claim 8, wherein the viscosity reducing agent or thinner is selected from the group consisting of toluene, mineral spirits, hexane, heptane, limonene, ethyl acetate, terpenes or mixtures thereof.

10. The process according to claim 1, further comprising the addition of optionally functionalized nanoparticles, or of vegetable powders, to the mixture of reactants.

11. The process of claim 10, wherein the optionally functionalized nanoparticles is selected from the group consisting of titanium dioxide, iron oxide, silica, zinc oxide, carbon black and mixtures thereof.

12. The process according to claim 10, wherein the final concentration of said nanoparticles does not exceed 10 wt % relative to the weight of the final composite bioelastomer.

13. The process according to claim 1, wherein a soft polysiloxane with acetoxy cross-linking is further added to said hydroxyl-terminated polysiloxane.

14. The process according to claim 1, comprising adding said hydroxyl-terminated polysiloxane to a solution of biodegradable polymer selected from cellulose derivatives, aliphatic polyesters and aromatic-aliphatic polyesters.

15. The process according to claim 1, wherein said starch is a non-chemically modified native starch, optionally comprising physically or chemically modified starches.

16. The process according to claim 1, wherein said starch is a native starch with its intrinsic water content.

17. The process according to claim 1, characterized in that the cross-linking reaction is carried out with addition of beetroot powder as catalyst for accelerating cross-linking.

18. The process according to claim 1, wherein said hydroxyl-terminated polysiloxane is polydimethylsiloxane.

* * * * *